Feb. 13, 1940.　　　　　O. GANO　　　　　2,190,063
TREATMENT OF POTATOES TO PRODUCE DRIED MASHED POTATOES
Filed Feb. 15, 1938
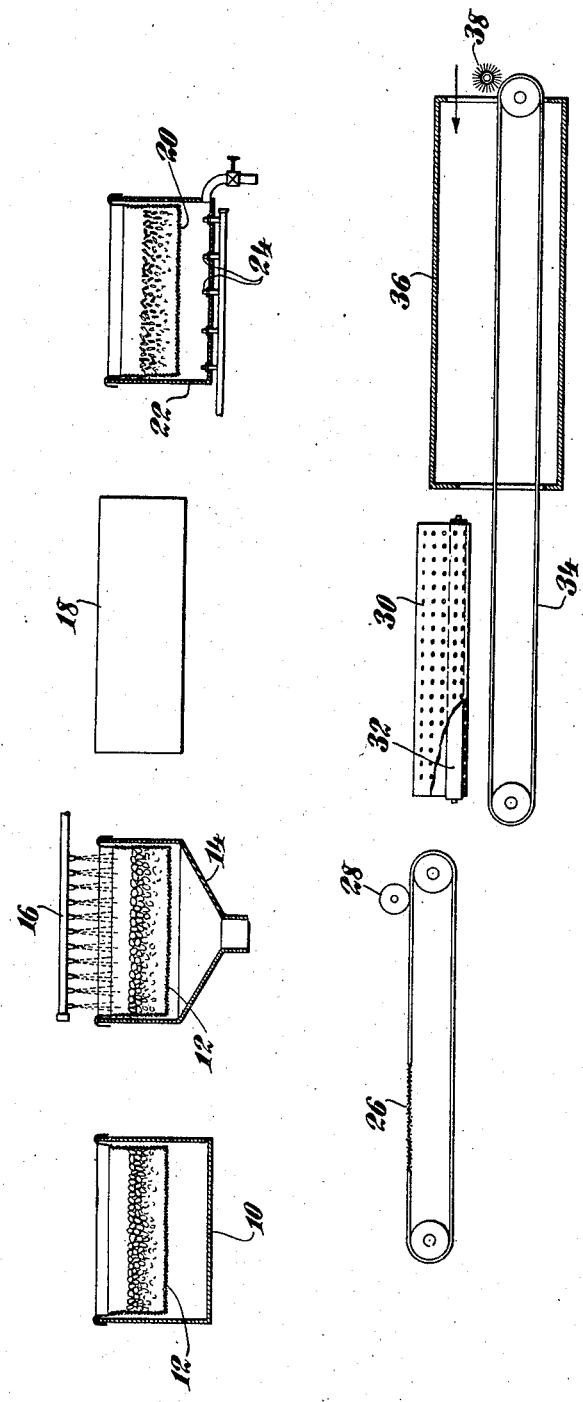
INVENTOR.
Orville Gano,
BY Hoguet, Neary + Campbell,
ATTORNEYS Patented Feb. 13, 1940

2,190,063

UNITED STATES PATENT OFFICE 2,190,063

TREATMENT OF POTATOES TO PRODUCE DRIED MASHED POTATOES

Orville Gano, Burley, Idaho, assignor to Potato Corporation of Idaho, Garwood, N. J., a corporation of Idaho Application February 15, 1938, Serial No. 190,577

6 Claims. (Cl. 99—207)

This invention relates to processes for treating potatoes to produce a novel dried potato product and particularly relates to processes for cooking, sub-dividing, and drying potatoes to produce a dehydrated potato product from which mashed potatoes of high quality may be made by a simple and a quick treatment.

An object of the invention is to treat potatoes to produce a product which contains substantially all of the natural constituents of the potatoes with the exception of the original moisture content.

Another object of the invention is to treat potatoes to produce a dry, sub-divided product having excellent keeping qualities and which is easily and quickly converted into high quality mashed potatoes.

A still further object of the invention is to produce a dry potato product which is characterized by natural potato flavor, ready disintegration upon treatment with hot water or milk into a mashed potato product of excellent flavor and texture and devoid of objectionable color.

The objects of the invention have been attained by means of a process including related steps such as cooking, sub-dividing, and drying, which are carried out under such controlled conditions of time, hydrogen ion concentration, and temperature that undesirable decomposition or change in the normal condition of constituents of the potatoes is avoided.

The starch granules or cells of potatoes consist of a cell wall and a nucleus of material variously identified as granulose or amylopectin. The cell walls constitute 70 to 83% of the starch cell and consist of materials variously identified as amylose or amylo-cellulose. There is considerable disagreement as to what is the exact chemical composition of the nuclear substance and the cell walls but, generally, the above terminology is used in describing it. The starch cells also contain substances which form acids upon admixture with water, for example, phosphorous pentoxide.

Potato starch cells or granules are stable up to about 105° C., when dry, but in the presence of moisture and acid tend to swell and burst when heated above 80° C.

If potatoes are boiled in the usual way, with water initially having a pH of about 7 or less, the acids normally present in the potatoes create a pH condition of about 5.5 to 6.5. The free acid tends to dissolve the cell walls leaving the nuclear material at least partially exposed to the action of the water. The nuclear material absorbs water, swells, bursts the cell walls, releases more acid, and ultimately is hydrolyzed by the acid. The swelling action is commonly known as gelatinization of the starch. Also, protein material which is present in the starch cells will be coagulated at temperatures of about 65° C. and above. The product, therefore, consists of acidic hydrolyzed and gelatinized nuclear material, ruptured cell walls, and is best typified by ordinary boiled potatoes. Such potatoes are generally solid and non-disintegrated and have little ability to throw off water. If dried, the potatoes become case-hardened and develop a yellow color.

The present invention involves treating potatoes in such a way that the great majority of the starch cells or granules are not disrupted; the starch is not gelatinized or hydrolyzed materially and may be readily dried without case-hardening or developing undesirable colors.

It has been found that by cooking potatoes with slightly alkaline water, the tendency of the cell walls of the starch cells or granules to dissolve is greatly diminished. In fact, it appears that the cell walls are toughened by the alkali and have increased resistance to penetration of the water and bursting. Likewise, loss of soluble constituents is greatly decreased. The acid forming compounds are retained in the cells or granules and hydrolysis and gelatinization cannot take place.

The cooking procedure must be carried out with great care in order to reduce rupture of the starch cells. It has been found that if the potatoes are subjected to slowly or gradually changing temperatures, rupture of the starch cells can be avoided. Likewise, loss of valuable constituents of the potatoes such as the flavoring material can be reduced and the starch will not be dextrinized. The cooked product, therefore, will not have the gelatinous or gluey texture which characterizes potatoes that are dried by known processes.

A typical process embodying this invention may consist of removing the skins from the potatoes in such a way that the valuable dietary materials which are located directly adjacent the skin of the potato are not lost. The skinning operation may consist of dipping the potatoes in a lye solution which dissolves or loosens the skin and thereafter subjecting these treated potatoes to the action of sprays of water which strip the dissolved material from the surface of the potato. After skinning, the potatoes are cut into slices or diced. The thickness of the pieces of potato bears a direct relationship to the subsequent treating process for reasons which will be presently explained.

The sliced potatoes are then placed in a tank or kettle of cold water or water at room temperature and sufficient weak alkali, such as Ca(OH)$_2$ or sodium carbonate, is added to maintain the potatoes and cooking water in a slightly alkaline condition. By cooking the potatoes under alkaline conditions, hydrolysis and discoloration of the starch is avoided because of the toughened condition of the cell walls which prevents exposure and loss of the nuclear material. The temperature of the water is gradually raised in any desirable way to its boiling point, the time required to increase the temperature of the water being such that the starch granules are not disrupted and the cell walls are retained intact. It has been found that this gradual increase of temperature allows an equally gradual increase in the pressure of the cells and such a slow change in temperature of the nuclear material that substantially no reaction, physical or chemical, takes place. The cells at the surface of the pieces of potato will be heated more severely than those spaced from the surface and as a result losses of carbohydrate will occur as well as gelatinization of the starch cell in which the walls have been ruptured by slicing.

As indicated above, the thickness of the pieces of potato is related to the duration of cooking treatment of the potatoes. Thus it has been found that thin slices of potato absorb too great a percentage of water, while slices of considerably greater thickness have a tendency to cook unevenly. Likewise, very thin pieces have insufficient mechanical strength to withstand the mechanical action of boiling. If the pieces are broken, a greater surface is exposed and greater solution losses and chemical change will take place. For these reasons it is desirable to have as low a ratio of exposed surface to volume as is possible, and at the same time, insufficient volume to prevent uneven cooking. In accordance with the present process, it has been found that pieces about 3/8 inches in thickness are the most satisfactory size, in that not too much water or moisture is absorbed and the potatoes may be cooked uniformly throughout and their temperature raised from substantially room temperature to the boiling point of water without disruption of the slices. In addition, uniformity of the size of the pieces can be obtained more readily than with slices of lesser thickness.

The cooking treatment may be continued after the vat has been raised to boiling temperature until the potatoes are substantially completely cooked. Inasmuch as the outer portions of the pieces are at a temperature of about 100° C., the cells unavoidably will swell sufficiently to burst and gelatinization will take place. However, the then gelatinized layer acts as insulation and prevents the inner portions from rising appreciably above 80° C. At this lower temperature, in an alkaline solution, the cells will not burst, but will retain their normal structure. The undisrupted cells create a "mealy" texture in the pieces which is highly desirable. Preferably any variation from complete cooking should be toward an under-done condition, since subsequent treatments allow the cooked state to be equalized throughout the pieces of potato. This cooking treatment may consist of boiling the potatoes for a period of between ten and fifteen minutes, at the end of which time the potatoes are quickly removed from the water and are allowed to stand for a short time at about room temperature. By permitting the potatoes to stand after the cooking treatment is completed, a substantial amount of moisture is expelled from the outer portions of the slices and the inner portions continue to cook because of the inability of the heat to dissipate, thereby tending to prevent undercooking of the center. This rest or dwell period, in effect, is a balancing or equalizing operation which causes greater homogeneity throughout all portions of the potato.

The potatoes may then be cooled to room temperature, and extruded through a suitable mechanism to produce thin strips or strings of moist potato. The moist strings are then subjected to a drying operation which is conducted at a temperature below that which would cause further swelling or disruption of the starch cells and discoloration of the strips. The strings are preferably not heated to above 80° C., at which temperature swelling of the cells will be resumed. The rate of drying is sufficiently low so that the shreds will be dried uniformly throughout and case-hardening avoided.

For a better understanding of the procedural steps involved in the treatment of the potatoes, reference may be had to the accompanying drawing, the single figure of which discloses diagrammatically a flow sheet of the process.

A specific example of one way in which the invention may be practiced is as follows:

The potatoes are skinned by dipping them in a lye solution in vat 10, the potatoes being supported in a perforated basket 12 which allows ready drainage of the lye therefrom. The concentration of the lye may vary between 10% and 25%, as may be desired. A dip of about 1½ minutes duration in a 15% lye solution has been found to be entirely satisfactory to soften and partially dissolve the skin portions of the potatoes. The time may be varied depending upon the concentration of the lye and the thickness or toughness of the skins of the potatoes. The basket 12 may then be removed to a washer 14 where sprays of cold water from a header 16 may be directed onto the potatoes to dissolve or remove the softened or partially dissolved skins of the potatoes. The potatoes are then delivered to a slicer, dicer, or cutting table 18 where the potatoes are cut lengthwise into strips or pieces about 3/8 inches in thickness. The pieces of potato are then transferred to a perforated basket 20 which is placed in a vat 22 containing cold water or water at about room temperature and at normal or atmospheric pressure, and which is rendered slightly alkaline by the addition of Ca(OH)$_2$. A pH of 10 to 10.2 has been found to be entirely suitable. The tank 22 is provided with nozzles 24 through which steam may be injected at such a rate that the water will be brought to boiling temperature in approximately ten minutes. This gradual increase in temperature together with the alkaline condition of the cooking water, as pointed out before, will prevent undue swelling and bursting of the starch cells or granules. The potatoes in basket 20 are then cooked for an additional period of about fourteen minutes, at the end of which time the water is drained quickly from the tank 22 and the potatoes allowed to stand for about a minute to equalize the moisture content and the cooked state of the potatoes.

The cooked potatoes are then dumped onto a perforated conveyer 26 where through contact with air at room temperature, the slices are reduced to about room temperature and additional evaporation of moisture takes place by the time they are discharged from the conveyer. Cooling at room temperature, because of economy of operation and more uniform dissipation of heat and moisture, has been found preferable to cooling by forced circulation, although the latter procedure may be followed if desired.

The potatoes at room temperature may then be delivered by the conveyer 26 to a mangler 28 consisting of a plurality of spaced knives which chop or cut the pieces into smaller pieces. If desired, the mangler 28 may be omitted since the subsequent step of extruding may be carried forward satisfactorily without further reducing the size of the cooked pieces. The pieces of cooked and cooler potatoes are delivered to an extruding device 30 which may consist of a tubular receptacle having an apertured cylindrical wall through which the potato material is forced by means of a roller 32 which travels without sliding on the inner surface of the apertured wall of the receptacle and forces the potato through the apertures. This extruding action forms the potato into thin strings or strips which fall upon or are delivered to a conveyer 34 of a drier 36 through which the strings are passed to dehydrate them. A countercurrent flow of air having an entering temperature of about 70° C. is used to remove moisture from the strings of potato. This temperature has been found to be sufficiently high to remove the desired percentage of moisture and render the potato strings stable while at the same time being insufficiently high to exceed the maximum temperature of 80° C., at which swelling of the starch cells is resumed and discoloration of the potato product occurs if the latter is in an acid condition.

The dried strings of potato may be removed from the conveyer 34 at the conclusion of the drying operation in any suitable way, such as for example, by means of the rotary brush 38, and delivered to storage or to suitable packaging machines.

The potato product which is produced by the preceding process is of white color and consists of thin dried strings of potato which have a characteristic potato flavor. This product may be taken with an equal quantity of boiling water or other suitable liquid and stirred thereinto and further cooked for about five minutes to produce a product which is equal or superior in appearance and flavor to mashed potatoes made in the usual way.

The process of making the dried mashed potatoes is such that the flavoring materials are not lost and no changes have occurred in the starch such as would render the final product of gelatinous or gluey consistency. The mashed potatoes produced from the dried product, therefore, are of fluffy and light texture, have a desirable white or creamy color and are in practically all respects superior to mashed potatoes which can normally be produced in the home.

It will be seen from the foregoing that a process has been produced which through its controlled conditions of time, hydrogen ion concenration and temperature results in a novel product. This product, because of its dried state, will keep for long periods of time and because of the retention of the valuable constituents thereof without change has all of the desirable characteristics of fresh potatoes. In fact, the final product is superior in many of its characteristics to such fresh potatoes in that many types thereof cannot be converted into mashed potatoes of satisfactory texture and taste.

It will be understood, of course, that there may be variations in the steps of the process without departing from the invention depending upon the type of potato treated, such as, for example, potatoes having thicker or thinner skins, a greater or lesser moisture content, or greater or lesser acidity. Therefore, the above described embodiments of the invention should be considered as illustrative only and not as limiting the scope of the following claims.

I claim:

1. The process of treating potatoes comprising removing the skins from potatoes, dividing the skinned potatoes into pieces about ⅜ths of an inch in thickness, placing the pieces of potato in alkaline water having a pH of about 10 at about room temperature, gradually raising the temperature of the water to boiling, continuing to boil the pieces for about 10 to 15 minutes, quickly separating the water from the pieces when cooked and allowing the pieces to cool, subdividing the pieces into small strips and drying the small strips at low temperature.

2. The process of treating potatoes set forth in claim 1 in which the time required to raise the cooking water from room temperature to boiling is about ten minutes.

3. The process of treating potatoes set forth in claim 1 in which the drying temperature is about 70° C.

4. The process of treating potatoes comprising removing the skin from the potatoes, dividing the potatoes into pieces about ⅜ths of an inch in thickness, placing the pieces in water containing an alkali at about room temperature, raising the temperature of the water to boiling so gradually that bursting of the starch cells is avoided, boiling the pieces for about 10 to 15 minutes, removing the pieces from the water and allowing them to cool and lose a part of their moisture content, subdividing the pieces into strings, and drying the strings at a temperature not higher than 80° C. to avoid case hardening of the strings and damage to starch cells by swelling to the bursting point.

5. The process set forth in claim 4 wherein the time required to increase the temperature of the water to boiling is about ten minutes.

6. The process of treating potatoes comprising removing the skin from the potatoes, cutting the potatoes into pieces of about ⅜ths of an inch in thickness, cooking the pieces by placing them in water containing a weak alkali at about room temperature, gradually increasing the temperature of the water to boiling and boiling the pieces until substantially completely cooked throughout, quickly separating the pieces from the water and allowing them to stand at room temperature until a portion of their moisture content has evaporated and they are equally cooked throughout, dividing the pieces into strings by extrusion and cooling the strings in a countercurrent flow of air at about 70° C.

ORVILLE GANO.